US006802777B2

(12) United States Patent
Seelig et al.

(10) Patent No.: US 6,802,777 B2

(45) Date of Patent: Oct. 12, 2004

(54) IMAGE ALIGNMENT GAMING DEVICE AND METHOD

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 0 days.

(21) Appl. No.: 09/894,197

(22) Filed: Jun. 27, 2001

(65) Prior Publication Data

US 2003/0003979 A1 Jan. 2, 2003

(51) Int. Cl.[7] .................................................. A63F 13/00

(52) U.S. Cl. ............................ 463/20; 463/20; 463/16; 463/9

(58) Field of Search ............................ 463/16–20, 30, 463/9; 11/11

(56) References Cited

U.S. PATENT DOCUMENTS

| | | | | | |
|---|---|---|---|---|---|
| 2,554,942 | A | | 9/1951 | Dobrowsky | |
| 4,760,388 | A | * | 7/1988 | Tatsumi et al. | 345/1.3 |
| 5,154,420 | A | * | 10/1992 | Gutknecht | 463/17 |
| 5,373,440 | A | * | 12/1994 | Cohen et al. | 273/139 |
| 5,609,524 | A | * | 3/1997 | Inoue | 463/20 |
| 5,722,891 | A | | 3/1998 | Inoue | |
| 5,749,576 | A | * | 5/1998 | Heinen et al. | 273/138.1 |
| 6,012,983 | A | * | 1/2000 | Walker et al. | 463/20 |
| 6,095,921 | A | * | 8/2000 | Walker et al. | 273/138.2 |
| 6,241,607 | B1 | * | 6/2001 | Payne et al. | 273/143 R |
| 6,254,481 | B1 | * | 7/2001 | Jaffe | 273/143 R |
| 6,302,791 | B1 | * | 10/2001 | Frohm et al. | 463/21 |
| 6,319,124 | B1 | * | 11/2001 | Baerlocher et al. | 273/138.1 |
| 6,347,996 | B1 | * | 2/2002 | Gilmore et al. | 273/139 |
| 6,375,570 | B1 | * | 4/2002 | Poole | 463/20 |
| 6,383,073 | B1 | | 5/2002 | Nagano | |
| 6,398,218 | B1 | * | 6/2002 | Vancura | 273/138.1 |
| 6,413,162 | B1 | * | 7/2002 | Baerlocher et al. | 273/143 R |

OTHER PUBLICATIONS

Slot Machines, a pictorial history of the first 100 years, fifth edition, Marshell Fey, copyright 1997, p. 167.*

* cited by examiner

*Primary Examiner*—John M. Hotaling, II

(74) *Attorney, Agent, or Firm*—Ryan A. Heck; Ian F. Burns & Associates

(57) ABSTRACT

A gaming device for playing a game. The device has a game display with several display sections. A game controller controls several fractional images that are displayed in the display sections. The game controller randomly selects the fractional image to display in each display section. A winning combination results when the fractional images are aligned such that they form a complete image. The game display can be a set of rotatable reels with each reel carrying the fractional images or the game display can be a video display. The reels are aligned vertically, horizontally, diagonally, a combination thereof, or in other ways.

29 Claims, 5 Drawing Sheets

IMAGE ALIGNMENT GAMING DEVICE AND METHOD

BACKGROUND OF THE INVENTION

1. Field of Invention

This invention relates to gaming devices and, more particularly, to a gaming device that adds to player excitement and satisfaction.

2. Description of Related Art

Many types of slot and video gaming machines have been designed over the years. The traditional slot machine has a series of annular reels disposed in side by side relationship that rotate separately about a common axis. The reels can be implemented mechanically or visually on a video display driven by a computer. The game players score or winnings are indicated by indicia on the peripheral surfaces of the reels which may align in any of a number of different combinations following a period of rotation of the reels. Players of gaming apparatus typically find it enjoyable to have a variety of different forms of gaming apparatus available. For this purpose, slot machines of the spinning reel type have been provided with a variety of different graphics, shapes, sound effects and scoring systems. Gaming machines that are more interesting generate more player excitement and in turn are played longer resulting in more revenue for the game operator.

Unfortunately, the similarity of slot machines poses a problem for slot machine manufacturers in differentiating their machines from competitors. Modifying slot machines to enhance player enjoyment are not beneficial if the basic geometry and function of the visual components of the machine is retained.

A current unmet need exists for a gaming device that is different than previous slot machines in order to provide game players with a more exciting and desirable gaming experience.

SUMMARY OF INVENTION

1. Advantages of the Invention

An advantage of the present invention is that it provides a gaming device that adds to player excitement and satisfaction.

Another advantage of the present invention is that it provides a gaming device that is interesting to a player and results in longer playing time.

A further advantage of the present invention is that it provides a gaming device that is readily distinguishable from conventional slot machines.

Another advantage of the present invention is that it provides a gaming device that awards a prize when several fractional images are assembled into a complete image.

These and other advantages of the present invention may be realized by reference to the remaining portions of the specification, claims, and abstract.

2. Brief Description of the Invention

The present invention comprises a gaming device for playing a game that includes a game display having several display sections. A game controller controls several fractional images that are displayed in the display sections. The game controller randomly selects the fractional image to display in each display section. A winning combination results when the fractional images are aligned such that they form a complete image. The game display can be a set of rotatable reels with each reel carrying the fractional images. The reels can be aligned vertically, horizontally, diagonally, a combination thereof, or in other ways. In another embodiment, the game display is a video display.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

Gaming Device

Figure 1:
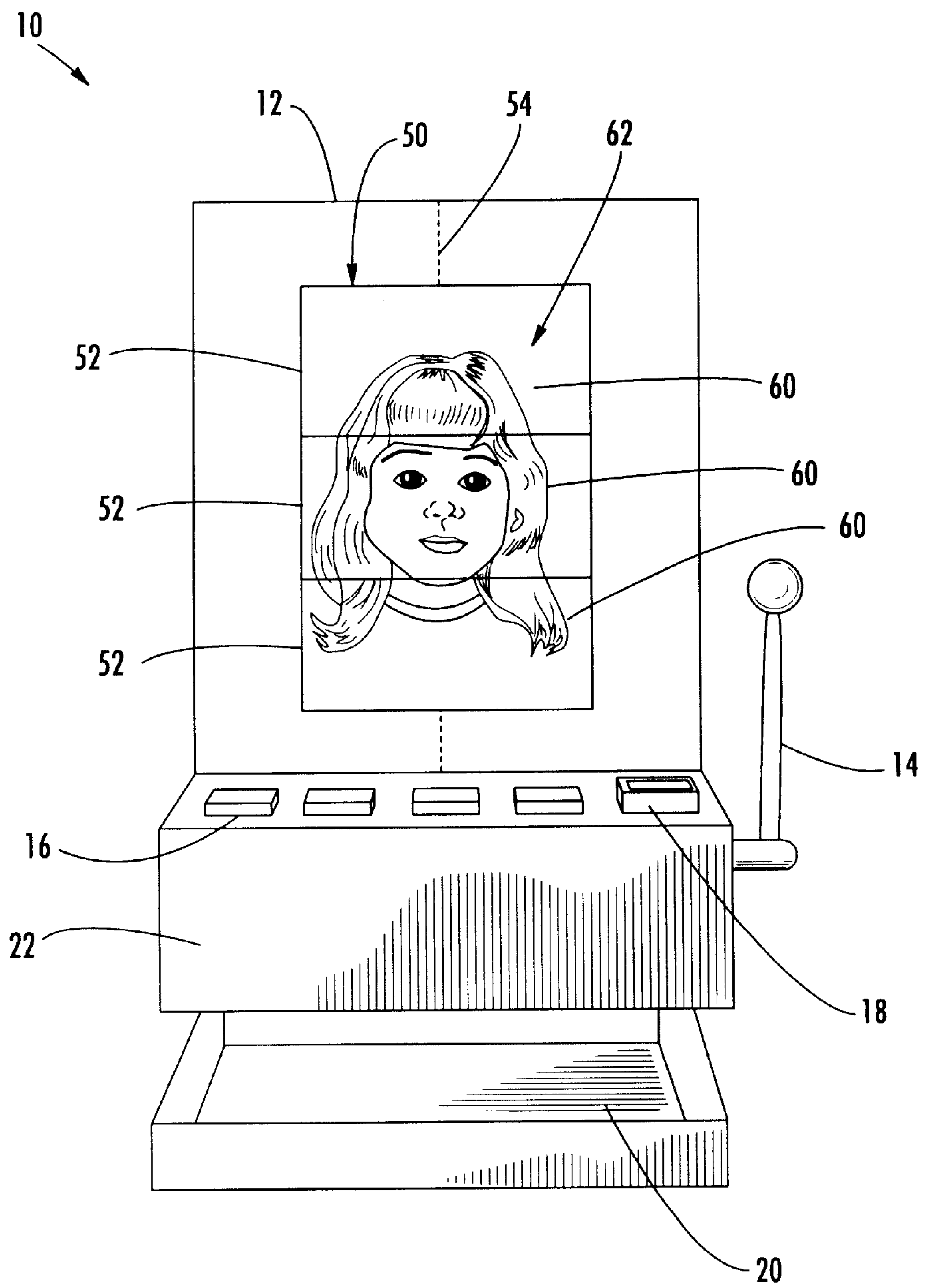
FIG. 1 is substantially a front view of a gaming device in accordance with the present invention in which the image displayed is a whole image.
Figure 2:
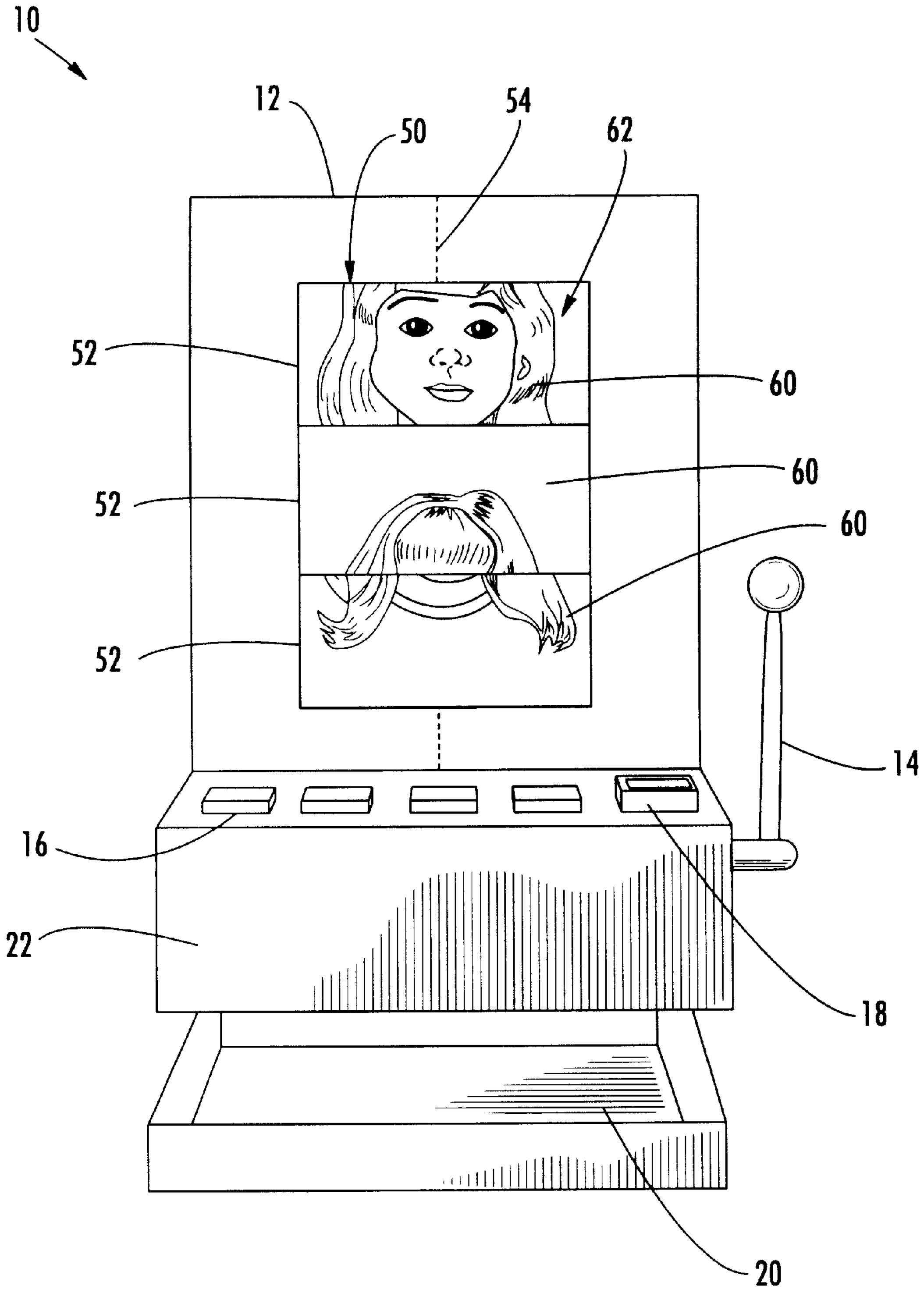
FIG. 2 is substantially a front view of the gaming device of FIG. 1 in which the image is a non-whole image.

Referring to FIGS. 1 and 2, a gaming device 10 is shown. Gaming device 10 comprises a case 12, a game display 50 having several or more display sections 52, a lever 14, selector buttons 16, a coin acceptor 18, a coin bin 20 and a game controller 22 adapted to control a plurality of fractional images 60 displayed in the display sections 52. The fractional images 60 form a whole or complete image 62.

Case 12 contains the gaming device components. A coin acceptor 18 accepts wagers from a game player. The coin acceptor can also accept tokens, paper currency and vouchers. A coin bin 20 is mounted below the case holds coins that are dispensed after a winning game event has occurred. Lever 14 is used by the game player to initiate play on gaming device 10. Lever 14 is pulled by the game player to start the game.

Display 50 has three display sections 52. Display 50 can be mechanical spinning reels or display 50 can be a video display that simulates mechanical spinning reels or display

50 can be other means to display an image, such as a video display. While display 50 is shown with three display sections 52, more of less sections could be used. For example, a 3×3 matrix of 9 display sections could be used. It is noted that the display sections are oriented or aligned vertically. The axis of rotation 54 of the reels is vertical with respect to viewing the display. The game player stands or sits upright facing the display. The axis of rotation is parallel to the game player. Each of the display sections contains a fractional image 60. The fractional image 60 is a portion of a whole or complete image 62. The image 62 can be a wide variety of interesting subjects such as pictures or paintings including movie stars, celebrities, famous landmarks, musicians, vehicles, buildings, politicians, etc. The whole image is a contiguous recognizable image. If desired a payline (not shown) can be added to the display to aid the player in seeing the alignment of the fractional images.

The whole image 62 is broken up into fractional images 60. In FIG. 1, the whole image has been broken into 3 fractional images. If desired, whole image 62 could be broken into fewer or more fractional images 60. A conventional game controller 22 controls the displaying of the images. Game controller 22 contains a random number generator to cause the mechanical reels or video display to generate a particular combination of fractional images.

During game play, a game player inserts a wager into coin acceptor 18 and then pulls lever 14 to start play. In the case that display 50 are mechanical reels, the reels spin or rotate about axis 54. Several of the fractional images would be placed on circumference of the reels. The fractional images move horizontally with respect the player viewing the display. As discussed above, the images could move vertically, diagonally, a combination thereof, or in other ways. The game controller 22 selects a particular image to stop at or display in each display section 52. Typically, the selector buttons 16 are used to tell the controller when to stop the rotating reels. In the case that display 50 is a video display, the video display simulates the mechanical reels and game controller 22 selects a particular image to stop at or display in each display section 52. In FIG. 1, the fractional images 60 line up to form a complete or whole image 62. In this example, the whole image 62 is a girls face. In FIG. 2, the fractional images 60 do not line up to form a complete or whole image 62.

When the display sections 60 form a complete or whole image 62, a game winning event is generated and the player is dispensed a payout in accordance with a payout table. When the display sections do not form a complete or whole image 62, a game losing event is generated and the player must deposit more coins or use accumulated credits to play again. If desired, the payout table can be structured to make a partial payout depending upon the number of fractional images that are properly aligned. For example, if 2 of the 3 images are properly aligned, the payout could be 50 percent of the payout for having all 3 of the images properly aligned. In the case where display 50 has multiple spinning reels to form a matrix of display sections 52, the complete image may be formed along a diagonal of the matrix or can be formed by having all of the display sections 52 show the complete images.

Flowchart

Figure 3:
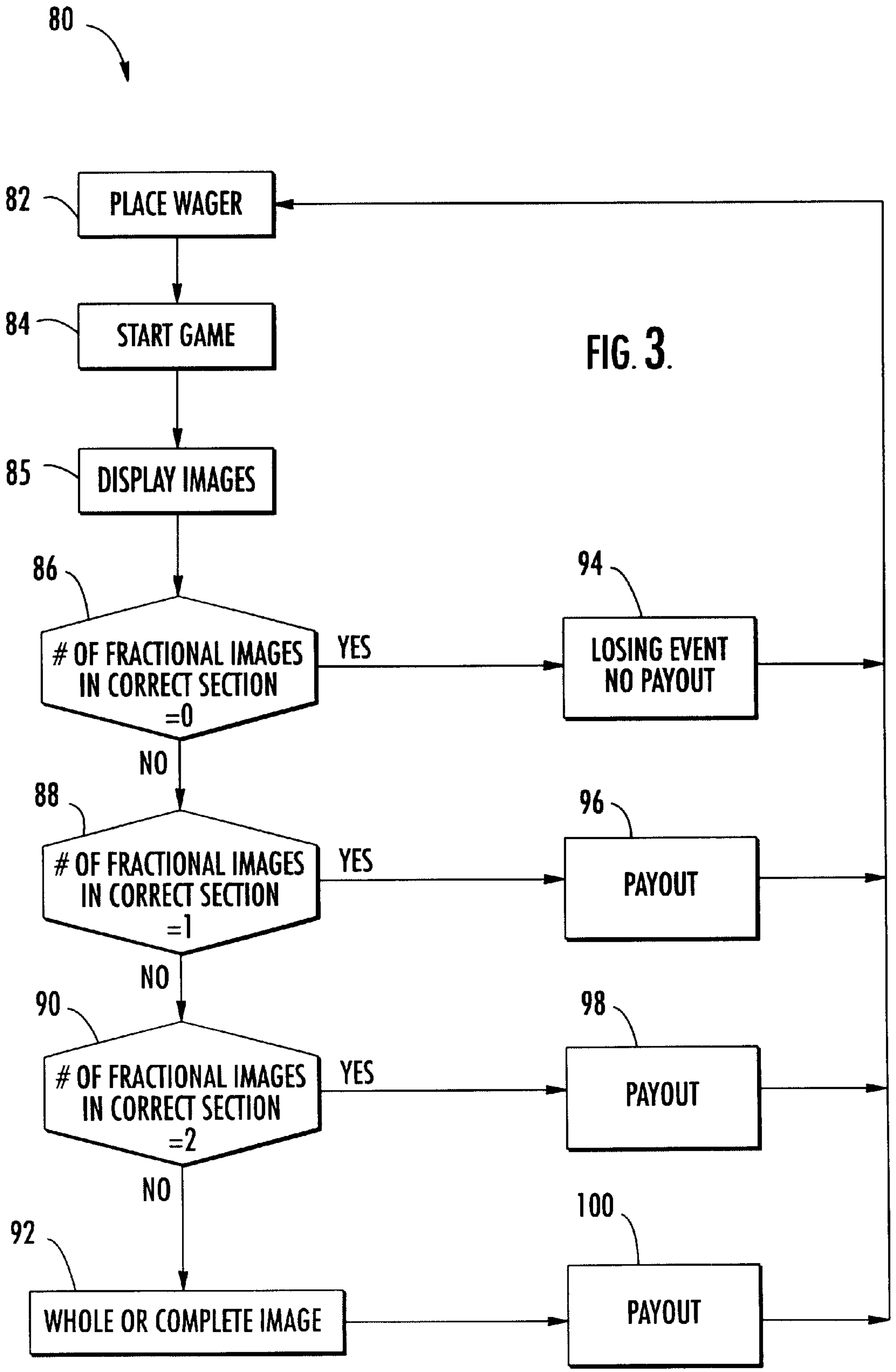
FIG. 3 is substantially a flow chart showing the operation of the gaming device of FIG. 1.

Referring to FIG. 3, a flowchart 80 is shown. Flowchart 80 depicts the steps followed in playing a game on gaming device 10. A wager is placed by the game player at step 82 in order to start game play on gaming device 10. At step 84, the player pulls lever 14 in order to start the game. At step 85, the game controller 22 determines which images are to be displayed in each display section and displays those images. Game controller 22 randomly selects the image to be displayed in each display section. Next, gaming device 10 moves to a decision step 86. At decision step 86 the number of fractional images that are aligned in the correct location or display section are determined. If the number of correctly aligned images is equal to zero, a yes is returned and the game progresses to step 94 where a losing event is determined along with no payout of an award. From step 94, the game loops back to step 82 to allow the game player to place another wager. If a no is returned at decision step 86, the game moves to decision step 88.

At decision step 88 the number of fractional images that are aligned in the correct location or display section is compared to see if they are equal to one. In the case where the answer is "yes" at step 88, the game progresses to step 96 where a payout is determined according to a redefined pay table and paid. For example, if a wager of one dollar was placed, the payout for correctly aligning one of the three images could be 50 cents. From step 96, the game loops back to step 82 to allow the game player to place another wager. If a no is returned at decision step 88, the game moves to decision step 90.

At decision step 90 the number of fractional images that are aligned in the correct location or display section is compared to see if they are equal to two. In the case where a yes is returned at step 90, the game progresses to step 98 where a partial payout is determined and paid. For example, if a wager of one dollar was placed, the payout for correctly aligning two of the three images could be one dollar. From step 98, the game loops back to step 82 to allow the game player to place another wager. If a no is returned at decision step 90, the game moves to step 92.

At step 92 the number of fractional images that are aligned in the correct location or display section is equal to three. The game next moves to step 100 where a full payout is determined and paid for a game winning event. For example, if a wager of one dollar was placed, the payout for correctly aligning all of the three images could be two dollars. From step 100, the game loops back to step 82 to allow the game player to place another wager.

Bonus Game Embodiment

Figure 4:
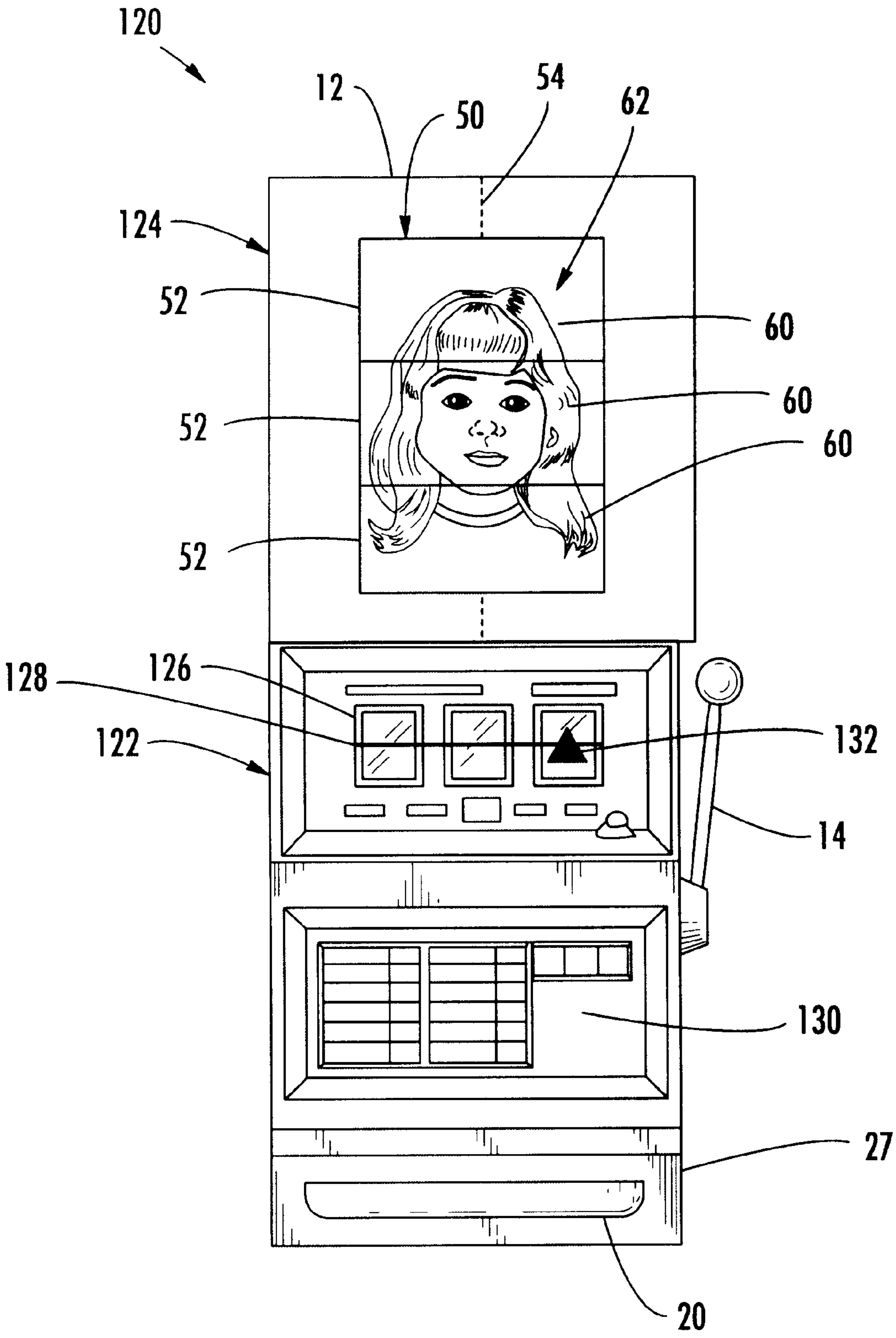
FIG. 4 is substantially a front view of an alternative embodiment of a gaming device in which the present invention is used as a bonus game.

The gaming device shown in FIGS. 1 and 2 is configured as a primary game. The gaming device can also be used as a bonus game that is attached to another primary game. Referring to FIG. 4, a bonus gaming device 120 is shown. Gaming device 120 comprises a primary game 122 and a bonus game 124 mounted on top. Primary game 122 can be almost any game. In FIG. 4, game 122 is shown as a conventional slot machine. Primary game 122 comprises several rotating reels 126 with a payline 128 that is actuated by a lever 14. One or more meters or displays 130 tell the game player their winnings and remaining playing credits. A special symbol 132 is generated on payline 126 to signify a bonus qualifying or generating event. After a bonus qualifying event has occurred the bonus game 124 becomes available for play. Bonus game 124 would then be played in a similar manner as to gaming device 10. The conventional slot machine triggers a bonus qualifying event that allow the game player the opportunity to play game device 124 to win a bonus prize or payout.

Bonus Game Flowchart

Figure 5:
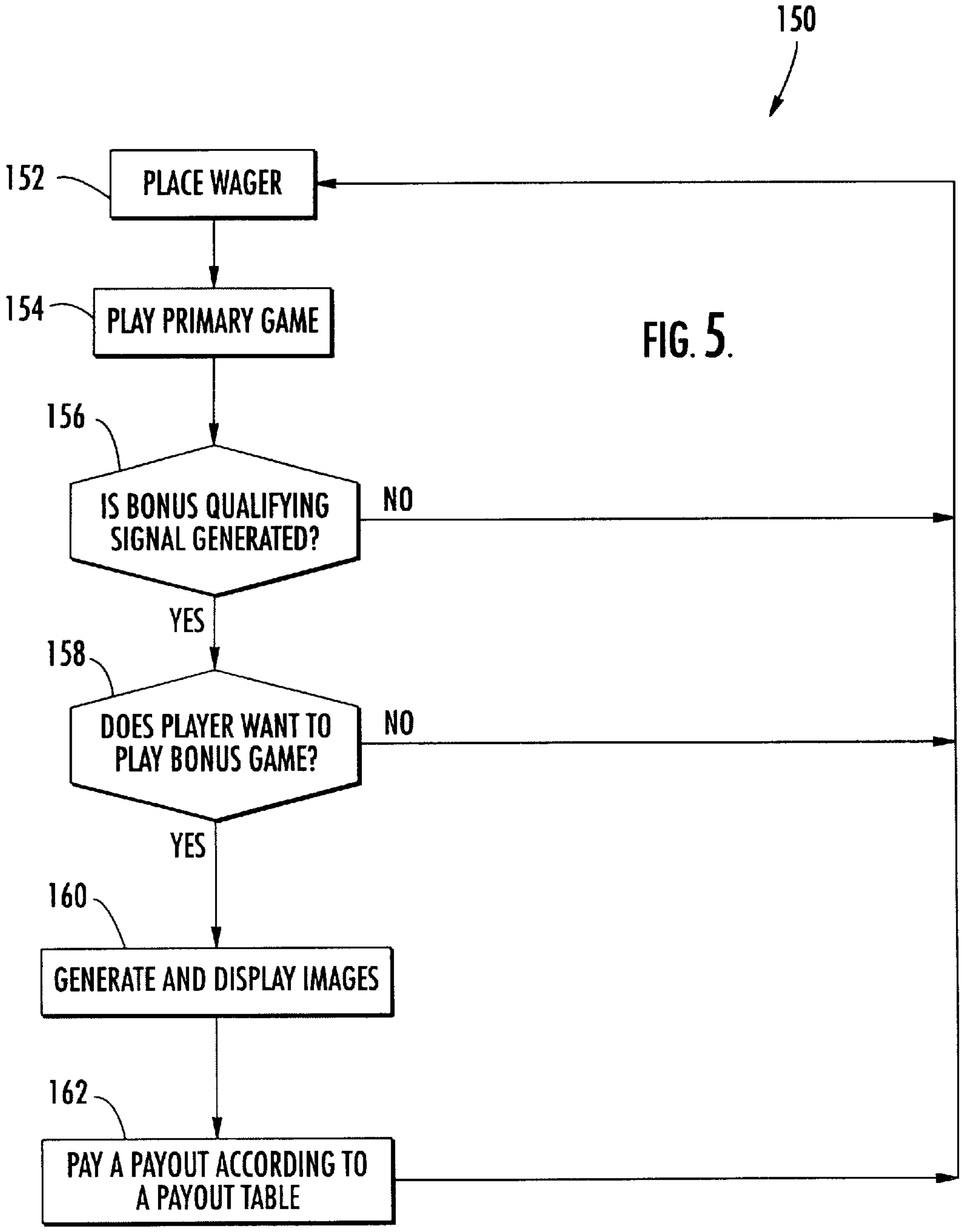
FIG. 5 is substantially a flow chart showing the operation of the bonus gaming device of FIG. 4.

Referring to FIG. 5, a flowchart 150 of the operation of bonus gaming device 120 is shown. Flowchart 150 depicts the steps followed in playing the bonus game. A wager is placed by the game player at step 152 in order to start game play on gaming device 122. At step 154, the player plays the primary gaming device 122. Next, gaming device 122 moves to a decision step 156. At decision step 156 the, game checks to see if the bonus qualifying event has occurred. If the bonus qualifying event has not occurred, the game loops back to step 152 to allow the player the opportunity to place another wager and play the primary game again. If the bonus qualifying event has occurred at step 156, the method continues to decision step 158. At decision step 158, the player may elect to play the bonus game or return to the primary game. If the player elects to return to the primary game, the game loops back to step 152. If the player elects to play the bonus game, the game proceeds to step 160. At step 160, the player plays the bonus game 124 which generates and displays either fractional or whole images. The operation at this point of the bonus game 124 is identical to that of gaming device 10 of FIGS. 1 and 2. At step 162, the game player is then paid a payout depending upon the number of images that are correctly aligned. The game then loops back to step 152 to allow the player to play the primary game 122 again.

CONCLUSION

The present invention solves many of the problems associated with the prior art. The present invention provides a gaming device that adds to player satisfaction and excitement. The present invention also provides a gaming device that is readily distinguishable from conventional slot machines. The present invention further provides a gaming device that awards a prize when several fractional images are displayed as a complete image.

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A method of playing a game using a gaming device comprising, but not necessarily in the order shown:

(A) placing a wager on the gaming device;

(B) starting the game;

(C) generating a game outcome;

(D) displaying images in at least a portion of a plurality of changeable sections of a display having a plurality of changeable sections formed in a matrix of m rows by n columns, where m and n are integers greater than one, a fractional image being displayed in the changeable sections; and (E) awarding a prize when a whole image is formed by the alignment of a plurality of fractional images appearing in a plurality of the changeable sections.

2. The method of playing a game according to claim 1, wherein the game is a primary game.

3. The method of playing a game according to claim 1, wherein the game is a bonus game played in association with a primary game.

4. The method of playing a game according to claim 1, wherein each changeable section comprises a mechanical reel.

5. The method of playing a game according to claim 4, the mechanical reels being rotatable about a vertical axis.

6. The method of playing a game according to claim 1, further comprising awarding a partial prize when less than the whole image is displayed, the partial prize corresponding to the number of fractional images corresponding to a particular whole image aligned on the display.

7. The method of playing a game according to claim 1, wherein the game outcome is generated by a game controller.

8. The method of playing a game according to claim 1, wherein the display comprises a plurality of vertically oriented spinning reels.

9. The method of playing a game according to claim 1, wherein the display comprises a plurality of horizontally oriented spinning reels.

10. The method of playing a game according to claim 1, wherein the display comprises a plurality of diagonally oriented spinning reels.

11. A gaming device for playing a game comprising:

(A) a game comprising a display comprising a plurality of display sections formed in a matrix of m rows and n columns, where m and n are integers greater than one;

(B) a game controller adapted to display images in at least a portion of the display sections, the displayed images comprising fractional images, the images appearing in the display sections being randomly selected, wherein a prize is awarded when a plurality of fractional images are aligned such that they form a complete image.

12. The gaming device according to claim 11, wherein the game display comprises a set of rotatable reels, each reel corresponding to a display section, each reel configured to display at least one fractional image.

13. The gaming device according to claim 12, wherein the reels rotate about a vertical axis.

14. The gaming device according to claim 12, wherein the reels are aligned vertically.

15. The gaming device according to claim 12, wherein the reels are aligned horizontally.

16. The gaming device according to claim 11, wherein the game display is a video display.

17. The gaming device according to claim 11, wherein the game is a bonus game.

18. The gaming device according to claim 11, wherein the game is a primary game.

19. The gaming device according to claim 11, wherein a partial prize is awarded when less than the complete image is displayed, the partial prize corresponding to the number of fractional images corresponding to the complete image that are aligned on the display.

20. The gaming device according to claim 11, wherein the complete image is formed along a diagonal of the matrix.

21. A gaming device comprising:

(A) a game display comprising a plurality of display sections, the display sections arranged in a matrix of m rows and n columns, where m and n are integers greater than one;

(B) at least one whole image divided into a plurality of fractional images, at least one of the fractional images being displayed in at least one of the display sections; and (C) a game controller in communication with the game display, the game controller adapted to award a prize when a plurality of the fractional images are aligned to form the whole image.

22. The gaming device of claim 21 wherein the game is at least part of a bonus game in association with a primary game.

23. The gaming device of claim 21 wherein the image comprises a picture selected from the group consisting of movie stars, celebrities, famous landmarks, musicians, vehicles, buildings, and politicians.

24. The gaming device of claim 21 wherein the display is formed by a plurality of mechanical spinning reels.

25. The gaming device of claim 24 wherein the reels rotate about a vertical axis.

26. The gaming device of claim 21 wherein the display comprises a video screen.

27. The gaming device of claim 21 wherein the display sections are vertically aligned.

28. The gaming device of claim 21 wherein the controller is configured to award a partial prize when less than the whole image is formed by the fractional images, the partial prize corresponding to the number of aligned fractional images corresponding to the whole image.

29. The gaming device of claim 21 wherein a whole image is formed along a diagonal of the matrix.

* * * * *